No. 641,764. Patented Jan. 23, 1900.
S. W. COLLINS.
RUBBER TIRE MACHINE.
(Application filed May 26, 1899.)
(No Model.)
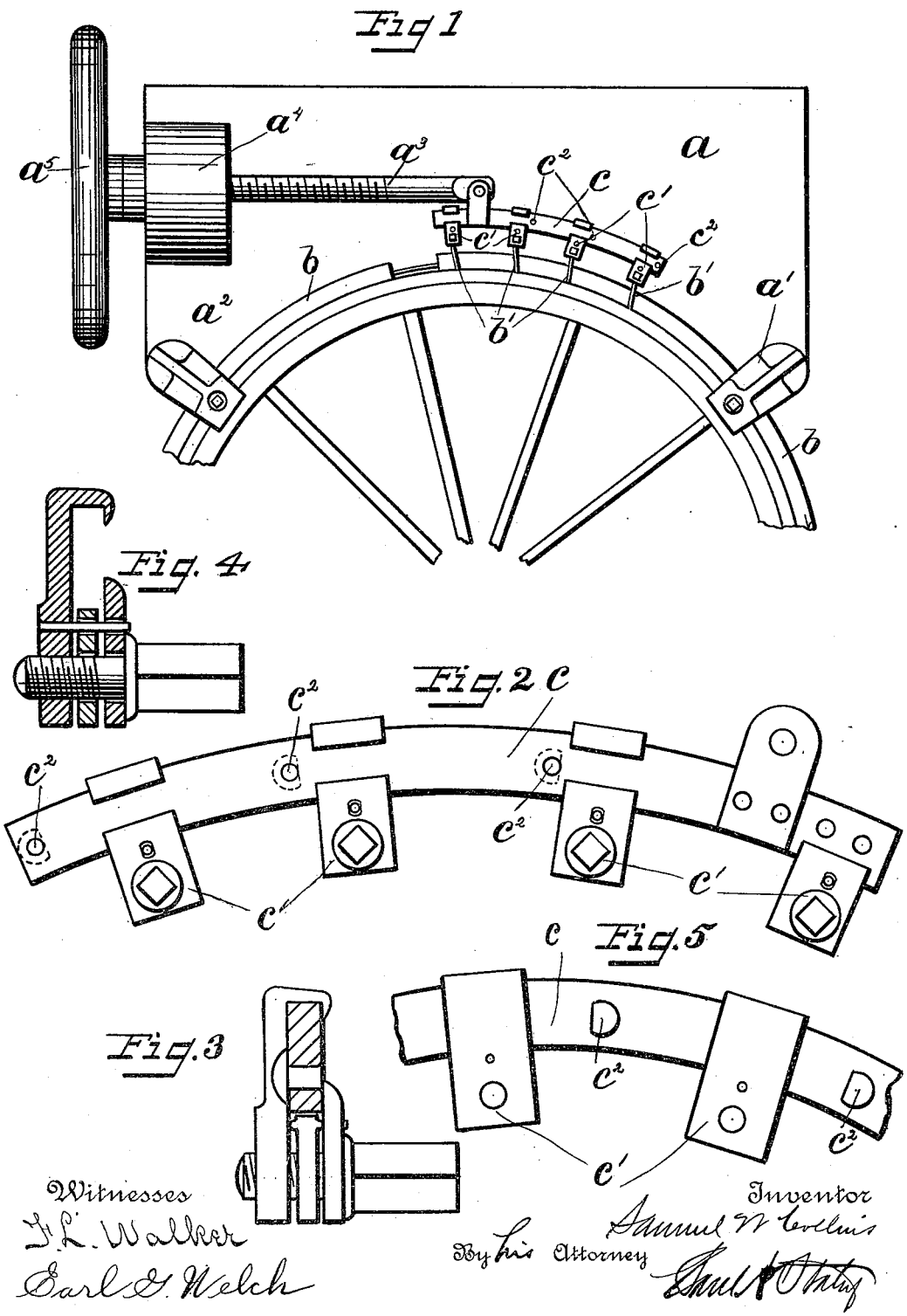
Witnesses
J. L. Walker
Earl D. Welch
Inventor
Samuel W. Collins
By his Attorney

UNITED STATES PATENT OFFICE.

SAMUEL W. COLLINS, OF INDIANAPOLIS, INDIANA, ASSIGNOR TO THE RUBBER TIRE WHEEL COMPANY, OF SPRINGFIELD, OHIO.

RUBBER-TIRE MACHINE.

SPECIFICATION forming part of Letters Patent No. 641,764, dated January 23, 1900.

Application filed May 26, 1899. Serial No. 718,456. (No model.)

*To all whom it may concern:*

Be it known that I, SAMUEL W. COLLINS, a citizen of the United States, residing at Indianapolis, in the county of Marion and State of Indiana, have invented certain new and useful Improvements in Rubber-Tire Machines, of which the following is a specification.

My invention relates to improvements in machines for setting rubber tires, the particular object of the invention being to provide means for closing up the space in the rubber tires which occurs when the same are applied to grooved or channeled wheel-rims by wires or other fastening-bands when the said bands are united with the tire in the groove or channel. I accomplish this by the devices set forth in the accompanying drawings, in which—

Figure 1 is a plan view of a device embodying my invention. Fig. 2 is a detail view of the pulling and clamping devices. Figs. 3 and 4 are sectional views of the same, and Fig. 5 is a detail view showing the opposite side of a portion of the device from that shown in Fig. 2.

Like parts are represented by similar letters of reference in the several views.

In equipping vehicle-wheels with rubber tires in the channeled groove retaining-bands of wire or similar material are used and means provided for tightening these bands and joining the same together with the rubber in the groove or channel. When the tire is properly tight, the space between the ends of the rubber left for joining the wires must be forcibly closed up, and flexible devices are inserted between the rubber and the channel-rim before the bands are tightened and a pulling device attached to these bands to pull up the rubber in the channel, and thus close the space in the rubber over the joints in the bands.

In the drawings, $a$ represents a table or support having clamps $a'$ $a^2$ to engage the wheel-rim, on which the rubber tire $b$ is mounted.

$b'$ are flexible devices placed between the rubber and the channel. A screw $a^3$ is mounted in a bearing $a^4$, preferably pivotally mounted on the table $a$, the screw being provided with a hand-wheel $a^5$, by which it may be drawn through the bearing $a^4$ in a well-known manner.

For closing the space in the rubber tire after the bands have been joined together I employ a pulling device preferably consisting of the screw $a^3$, located in the pivoted bearing-support $a^4$. To this pulling device is attached a bar $c$, preferably curved slightly to correspond to the periphery of the wheel, and on this pivoted bar there are mounted loosely a series of clamps $c'$ of any suitable number. These clamps, as before stated, are mounted loosely on the bar, but stops $c^2$ are provided in this bar, by which the movement of the clamps is limited. When these clamps are against the respective stops, they stand at a substantially uniform distance apart. In inserting the flexible devices $b'$ under the tire for pulling the rubber to close the joint said devices are placed at a distance apart equal to the distance between the stops on this pulling-bar. When the tire is tightened, this distance will be diminished by an amount equal to the compression which is placed in this part of the tire which is necessary to close the space over the joint in the bands. In closing the space in the tire the clamps on this pulling-bar will be slipped along the bar until they engage with these flexible devices attached to the tire, and they will be at a distance apart equal to the original distance less the proportional amount of compression. The wheel being properly clamped in position to be operated on, the pulling device is operated. The first clamp coming against the stop draws the rubber until the compression of that part of the rubber between the first and second pulling devices is removed. By this time the stop on the bar is brought up against the second clamp until it begins to move, and so on successively, each clamp sliding along the bar until it contacts with its respective stop, which contact will take place when the surplus compression between that clamp and the next preceding one has been taken out, after which that portion of tire will be moved bodily in the channel. This continues until all of the clamps are pulling, and if the compression has been properly placed in the rubber the space will be closed by the time all the surplus compression has been taken out and the tire left with a uniform compression throughout.

Having thus described my invention, I claim—

1. In a tire-setting machine, the combination with a series of flexible connecting devices arranged and adapted to be placed between the channel and the rubber of a rubber tire, a series of clamping devices to engage said pulling devices, a support for said clamping devices on which said clamping devices are loosely mounted, and stops to limit the movement of said clamping devices thereon, and means for pulling said supporting-bar to cause said clamps to successively be engaged with said stops, substantially as and for the purpose specified.

2. The combination with a wheel-support, a pulling device, a curved bar attached to said pulling device, a series of clamps mounted loosely on said bar, and a series of stops to limit the movement of said clamps, in combination with flexible metallic connecting devices arranged and adapted to be placed between the rubber and its supporting-channel, substantially as specified.

3. The combination with a wheel-support, a pulling device, a bar attached to said pulling device, and a series of holding devices mounted loosely on said bar, a series of stops to limit the movement of said holding devices, and means for connecting said holding devices to the rubber tire, substantially as specified.

In testimony whereof I have hereunto set my hand this 6th day of May, A. D. 1899.

SAMUEL W. COLLINS.

Witnesses:
JOHN W. PARKHURST,
CHAS. I. WELCH.